Feb. 28, 1939.  E. HERING  2,149,020
CHANGE SPEED GEAR
Filed Feb. 15, 1937  2 Sheets-Sheet 2
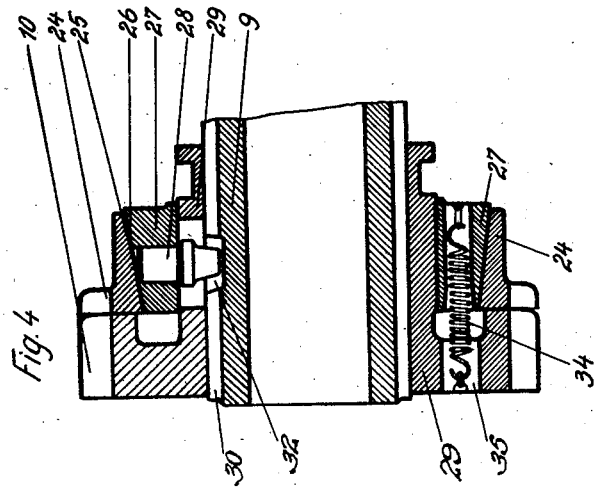
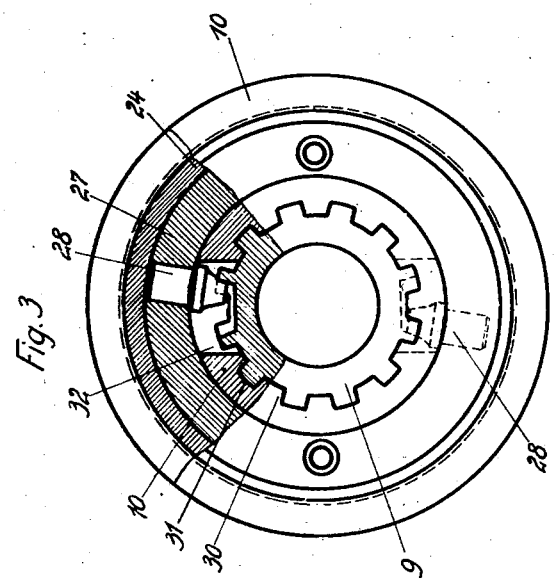
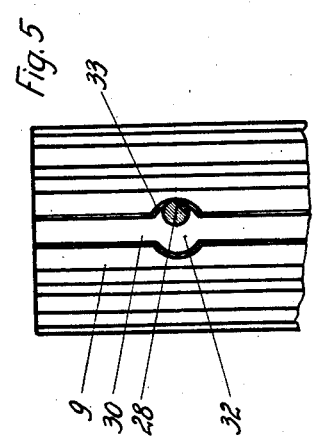
Ewald Hering
Inventor:
his Atty.

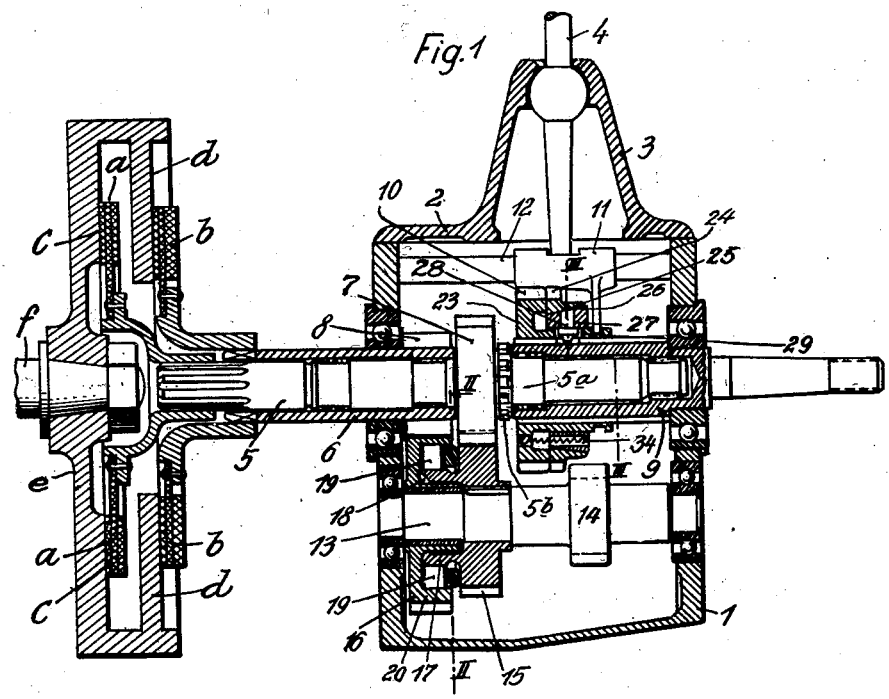

Patented Feb. 28, 1939

2,149,020

UNITED STATES PATENT OFFICE 2,149,020

CHANGE SPEED GEAR

Ewald Hering, Berlin-Siemensstadt, Germany

Application February 15, 1937, Serial No. 125,834
In Germany February 15, 1936

5 Claims. (Cl. 74—339)

My invention relates to change speed gears, particularly for use in self-propelled vehicles such as motor cars.

It is an object of my invention to provide a change speed gear in which a proper engagement of the wheels is secured by suitable synchronizing means. It is a particular object of my invention to provide means for synchronizing wheels arranged on different shafts in order to bring them into engagement.

It is another object of my invention to provide a change speed gear in which a plurality of driving shafts is provided so as to obtain in each position of the change gear lever a plurality of different speeds. A gear of this kind is particularly effective if combined with a synchronizing device according to my invention.

Other objects of my invention will be seen from the following detailed description and claims.

In the drawings affixed to this specification and forming part thereof a change speed gear according to my invention is diagrammatically illustrated by way of example.

In the drawings

Fig. 1 is a side elevation, partly in section, of a change speed gear according to my invention, Figs. 2 and 3 are cross sections at an enlarged scale on the lines II—II and III—III, respectively, Fig. 4 is a longitudinal section of the detail shown in Fig. 3 including a partly elevational and partly sectional view of the dog clutch connecting the main driving shaft to the driven shaft, Fig. 5 is a plan view of the central shaft forming part of the detail illustrated in Figs. 3 and 4.

Referring now to the drawings and first to Fig. 1, 1 is the gear box, the cover 2 of which is provided with a cone-shaped extension 3, at the top of which the gear lever 4 is fulcrumed. The driving shaft comprises a main shaft 5 and an auxiliary hollow shaft 6 mounted on the main shaft and rotatable with respect to the latter. The main shaft 5 projects inwardly beyond the hollow shaft 6 and has a pinion 7 fixed on the projecting portion. 8 is a pinion fixed to the inner end of the hollow shaft 6. 9 is the driven shaft. The innermost end of the main driving shaft 5 is formed with an extension 5a which is rotatably received in the hollow inner end portion of the driven shaft 9. On the driven shaft 9, there is arranged an axially sliding pinion 10 the construction of which will be more fully described hereinafter. The sliding pinion can be displaced in axial direction by means of the lever 4 through an intermediate member 11 slidably arranged on a rod 12 fixed in the casing 1 parallel to the shafts such as 5, 6, and 9. 13 is the lay shaft on which two pinions 14 and 15 are rigidly mounted. Pinion 15 meshes permanently with pinion 7 and pinion 14 can be brought into engagement with pinion 10 when the latter is shifted to the right. 16 is a pinion loosely mounted on the lay shaft 13 and being in permanent mesh with pinion 8. All the shafts run in suitable ball bearings as indicated in Fig. 1.

The pinions 15 and 16 are interconnected by means of a unidirectional drive which operates as a free-wheel clutch. The hub of pinion 15 is provided with an extension 17 protruding into an annular recess 18 of the pinion 16, rollers 19 being interposed between the extension 17 and the circumferential portion 20 of pinion 16 and held apart from one another by means of extensions 21 radially protruding from the inner surface of flange 20. As will be seen from Fig. 2 the outer surface of extension 17 is shaped so as to form a set of cams 22 the number of which is equal to that of the rollers 19. Thus a rotation of pinion 15 and extension 17 in the direction of the arrow shown in Fig. 2 will not be transmitted to flange 20 and pinion 16 whereas a rotation of pinion 16 in the same direction will cause a rotation of pinion 15. In other words a rotation of the main driving shaft 5 that causes the pinion 15 to rotate in the direction of the arrow in Fig. 2 will allow the hollow shaft 6 to remain stationary whereas a rotation of the latter in the same direction will cause the main shaft to rotate, the drive being transmitted through the pinions 8 and 16, the unidirectional drive 20, 19, 17, and the pinions 15 and 7.

23 is a dog clutch for directly coupling the driving shaft 5 to the driven shaft 9. In Figure 1, this clutch is shown in neutral position. The sliding pinion 10 is in a position in which the fixed set of dogs 5b, between pinion 7 and extension 5a, is disengaged from the movable dogs of the clutch formed by the ribs provided on the inner surface of the pinion 10 and described in more detail hereinafter. It should be understood that the dog clutch 23 in its engaged position, which is obtained by shifting the pinion 10 toward the left, will drive the driven shaft 9 even if the hollow shaft 6 is driven by the engine since, as set out hereabove, in this case a rotation is imparted to the main shaft 5.

By shifting the slidable pinion 10 to the right it is to be brought in mesh with pinion 14. In order to facilitate the engagement of these pinions a device for synchronizing their speeds is provided which is now to be more fully described with reference to Figs. 1 and 3 to 5.

Pinion 10 is associated with an auxiliary pinion 24 of relatively small weight. The inner surface 25 of the pinion 24 is shaped as a cone cooperating with the corresponding conical outer surface 26 of an annular member 27 to which one or a plurality of pin-shaped members 28 are secured each of which protrudes through a suitable hole in the flange 29 of pinion 10 into one of the longitudinal grooves 30 provided on the surface of shaft 9 for engagement with corresponding grooves 31 provided on the inner surface of pinion 10. The tips 10a of the ribs separating the grooves 31 form the movable dogs of clutch 23. Each of the grooves 30 into which a pin 28 protrudes is enlarged so as to form a recess 32 one of the sides 33 of which the pin 28 will engage as shown in Figs. 3 and 5 whenever the pinion 10 and the annular member 27 rotate at different speeds, thus preventing a further shifting of pinion 10 in axial direction. 34 are tension springs arranged in suitable borings 35 provided in the hub of the pinion 10' and the annular member 27 and secured to them so as to tend to draw these members towards each other.

From the foregoing it will be seen that when pinion 10 is shifted to the right in order to bring it into engagement with pinion 14, the auxiliary pinion 24 will engage with pinion 14, and, unless the speeds of shaft 9 and pinion 14 are equal, will impart an angular displacement to annulus 27 so that each pin 28 engages one of the sides 33 of its recess 32 thus locking pinion 10 against further axial displacement. The pressure, however, exerted through lever 4 on pinion 10 will cause a frictional engagement between pinion 24, annulus 27 and pinion 10 by which the speed of the latter is gradually imparted to the annulus 27 and to pinion 24 until synchronism is reached and pinion 10 becomes free to engage pinion 14.

The operation of the device is as follows:

The shafts 5 and 6 may be alternatively coupled to a driving engine (not shown) by means of individual friction clutches a and b fixed to the outer ends of the shafts 5 and 6, respectively, and adapted to be brought alternatively in contact with corresponding coupling surfaces c, d of a flywheel e rotating with the shaft f of the engine. Thus, either the shaft 5 or the shaft 6 may be coupled to the engine so as to be driven at a predetermined speed, which is the same for both shafts. A double clutch of this type is described and claimed in detail in my copending patent application Serial No. 125,251.

Be it assumed that the members of the change speed gear are in the position in which the inner ribs of the pinion 10 engage the dogs 5b, and the shaft 5 is thus directly coupled to the driven shaft 9. Then the driven shaft 9 will rotate at the highest possible speed (fourth speed) if shaft 5 is coupled to the engine. If, however, shaft 6 is coupled to the engine shaft 5 will be rotated in the manner described hereabove through pinions 8, 16, unidirectional drive 20, 19, 17, and pinions 15, 7. Obviously with gear ratios provided by pinions such as shown in Fig. 1 the speed of the shafts 5 and 9 will be much lower than in the first case in which shaft 5 is coupled to the engine.

Besides the engaged position of the members of the change speed gear and the neutral position shown in Fig. 1, there is still another position in which the dog clutch 23 is disengaged and pinion 10 meshes with pinion 14. In this position too the driven shaft 9 may be rotated at two different speeds by driving the lay shaft 13 either from shaft 5 through pinions 7 and 15 or from shaft 6 through pinions 8 and 16 and the unidirectional drive 20, 19, 17.

Thus it will be seen that there are obtainable four different speeds with only two positions of the lever 4. It should be understood that for shifting pinion 10 into engagement with pinion 14 by means of lever 4 when the vehicle is running it is not absolutely necessary to fully disengage both the couplings connecting the shafts 5 and 6 to the engine. On the contrary, owing to the provision of the unidirectional drive between the shafts, this step, if desired, may be carried out with hollow shaft 6 connected to the engine by means of the friction clutch b.

It should be understood that a reverse gear wheel may be provided which may be designed and arranged in customary manner and does not need a detailed description.

I wish it to be understood that I do not desire to be limited to the exact details of construction shown and described for obvious modifications will occur to a person skilled in the art.

I claim:

1. A change speed gear comprising two shafts, a pinion fixedly mounted on one of said shafts, a pinion mounted axially displaceable on the other shaft and having a hub, an annular member loosely mounted on said hub and having a conical outer surface, a second annular member loosely mounted on said first annular member and having a conical inner surface being in frictional engagement with the conical outer surface of said first annular member, said second annular member being designed as an auxiliary pinion and means for locking said second pinion against axial displacement whenever said second pinion and said first annular member rotate at different speeds.

2. A change speed gear as claimed in claim 1, said locking means comprising a pin-shaped member secured to said first annular member and protruding through a hole in said hub into a longitudinal groove provided on said other shaft, said groove being provided with an enlargement arranged so as to be entered by said pin-shaped member when said second pinion approaches said first pinion.

3. A change speed gear comprising two driving shafts, a lay shaft, a driven shaft, a fixed pinion on each of said driving shafts, a fixed and a loosely mounted pinion on said lay shafts, said pinions being in mesh with said pinions on said driving shafts, respectively, a unidirectional drive arranged between said pinions on said lay shaft, a third pinion fixedly mounted on said lay shaft, a pinion mounted axially displaceable on said driven shaft and having a hub extended in direction to said third pinion on said lay shaft, an annular member loosely mounted on said hub and having a conical outer surface, a second annular member loosely mounted on said first annular member and having a conical inner surface being in frictional engagement with the conical outer surface of said first annular member, said second annular member being designed as an auxiliary pinion and means for locking said pinion on said driven shaft against axial displacement whenever said pinion on said driven shaft and said first annular member rotate at different speeds.

4. A change speed gear as claimed in claim 3, said locking means comprising a pin-shaped member secured to said first annular member and protruding through a hole in said hub into a longitudinal groove provided on said driven shaft, said groove being provided with an enlargement arranged so as to be entered by said pin-shaped member when said pinion on said driven shaft approaches said third pinion on said lay shaft.

5. A change speed gear comprising two shafts, a pinion fixed to one of said shafts, a pinion axially displaceable on the other shaft for engagement with and disengagement from said first pinion, an annular member mounted for axial displacement with said second pinion, a second annular member arranged for frictional engagement and axial displacement with said first annular member, said second annular member including an auxiliary pinion engaging said first pinion during the first stage of the axial displacement of the second pinion towards the first pinion, and means controlled by said first annular member to lock said second pinion against further displacement in the said direction as long as said second pinion and said auxiliary pinion are rotated at different speeds.

EWALD HERING.